(12) United States Patent
Johnson

(10) Patent No.: US 12,318,815 B2
(45) Date of Patent: Jun. 3, 2025

(54) PRESSURE WASHER WAND CLEANING ATTACHMENT

(71) Applicant: John Johnson, Spring Branch, TX (US)

(72) Inventor: John Johnson, Spring Branch, TX (US)

( * ) Notice: Subject to any disclaimer, the term of this patent is extended or adjusted under 35 U.S.C. 154(b) by 312 days.

(21) Appl. No.: 17/745,914

(22) Filed: May 17, 2022

(65) Prior Publication Data

US 2022/0371059 A1 Nov. 24, 2022

Related U.S. Application Data

(60) Provisional application No. 63/189,874, filed on May 18, 2021.

(51) Int. Cl.
| | |
|---|---|
| *B08B 1/00* | (2024.01) |
| *A46B 5/00* | (2006.01) |
| *A46D 1/00* | (2006.01) |
| *B08B 1/12* | (2024.01) |
| *B08B 1/32* | (2024.01) |
| *B08B 3/02* | (2006.01) |
| *B08B 7/04* | (2006.01) |
| *B60S 3/04* | (2006.01) |

(52) U.S. Cl.
CPC .............. *B08B 1/12* (2024.01); *A46B 5/0095* (2013.01); *A46D 1/0207* (2013.01); *B08B 1/32* (2024.01); *B08B 3/026* (2013.01); *A46B 2200/3046* (2013.01); *B08B 2203/0264* (2013.01); *B60S 3/048* (2013.01)

(58) Field of Classification Search
CPC .. B08B 1/12; B08B 1/32; B08B 3/026; B08B 2203/0264; A46B 5/0095; A46B 2200/3046; A46D 1/0207; B60S 3/048
See application file for complete search history.

(56) References Cited

U.S. PATENT DOCUMENTS

| | | | | |
|---|---|---|---|---|
| 5,626,158 | A | * | 5/1997 | Gratopp ................. B44D 3/006 134/900 |
| 7,185,834 | B1 | * | 3/2007 | Davidson ................ B05B 9/007 239/722 |
| 9,561,520 | B2 | * | 2/2017 | Metaxatos .......... B05B 13/0278 |
| 10,189,034 | B2 | * | 1/2019 | Endo ..................... B05B 3/0427 |
| 10,799,016 | B2 | * | 10/2020 | DePascale ......... A46B 15/0012 |
| 2007/0113368 | A1 | * | 5/2007 | Alexander ............. B08B 3/026 15/385 |
| 2008/0031678 | A1 | * | 2/2008 | Gansebom ............. B08B 3/026 401/137 |
| 2009/0065607 | A1 | * | 3/2009 | Gardner ............... A46B 11/066 239/589 |

(Continued)

FOREIGN PATENT DOCUMENTS

FR 3052370 A1 * 12/2017 ............... B05B 1/28

OTHER PUBLICATIONS

FR-3052370-A1—English Machine Translation (Year: 2017).*

*Primary Examiner* — Marc Carlson
(74) *Attorney, Agent, or Firm* — Brennan, Manna & Diamond, LLC

(57) ABSTRACT

The present invention relates generally to the field of pressure washer wands and a cleaning attachment that can be attached to any standard pressure washer wand. The attachment has a roller assembly with a bristled roller head. The head can be positioned in front of the spray tip of a wand such that water that exits the wand and causes the head to spin.

15 Claims, 5 Drawing Sheets

(56) References Cited

U.S. PATENT DOCUMENTS

| | | | | |
|---|---|---|---|---|
| 2009/0265876 A1* | 10/2009 | Gardner | ............... | B08B 13/00 15/322 |
| 2013/0068857 A1* | 3/2013 | Hite | ............... | B08B 3/026 239/288 |
| 2020/0230658 A1* | 7/2020 | Neal | ............... | B08B 1/12 |
| 2022/0289150 A1* | 9/2022 | Enow | ............... | B05B 12/002 |
| 2023/0059781 A1* | 2/2023 | Lee | ............... | B05B 7/2443 |

\* cited by examiner

PRESSURE WASHER WAND CLEANING ATTACHMENT

CROSS-REFERENCE TO RELATED APPLICATION

The present application claims priority to, and the benefit of, U.S. Provisional Application No. 63/189,874, which was filed on May 18, 2021, and is incorporated herein by reference in its entirety.

FIELD OF THE INVENTION

The present invention relates generally to the field of pressure washers and related attachments. More specifically, the present invention relates to a pressure washer wand cleaning attachment that can be attached to a standard pressure washer wand. The attachment includes a roller assembly that has a bristled roller head. The head can be positioned in front of the spray tip of a wand such that water that exits the wand and causes the head to spin or rotate. Further, an additional embodiment of the device may have a pressure washer wand, which is in fluid communication with the attachment, such that water can leave the wand and can travel through the hollow frame of the attachment to the roller head. Then, the water exits the roller head via a plurality of openings. Accordingly, the present disclosure makes specific reference thereto. Nonetheless, it is to be appreciated that aspects of the present invention are also equally applicable to other like applications, devices and methods of manufacture.

BACKGROUND OF THE INVENTION

In order to provide a clean appearance, many vehicle or building owners and auto detailers regularly wash vehicles or building exteriors. A typical washing process involves spraying the vehicle or building exterior with water and then applying soap or other cleansing solution to the exterior. Traditionally, soap is applied via a sponge, brush or mitt that is saturated with soap and is scrubbed in a circular motion on a vehicle or building exterior by the individual cleaning the vehicle or building. However, adequately scrubbing all portions of a vehicle or building exterior is very physically demanding, and often requires an individual to bend down to scrub hard-to-reach areas of the exterior. In addition, the height of vehicles like SUVs, RVs or other high-profile vehicles may not be easy to reach without the use of a ladder or step stool. Further, the repetitive scrubbing motion needed for adequate cleaning can be physically demanding for some individuals. In addition, a user must sequentially rinse, scrub and then re-rinse the exterior surface to clean off any applied soap. However, this process must be done sequentially and cannot be done simultaneously in an easy manner.

Therefore, there exists a long-felt need in the art for a device that allows a user to more easily wash and clean the exterior surface of the vehicle including high profile vehicles. Further, there exists a long-felt need in the art for a device that allows a user to more easily wash and clean the exterior surface of a vehicle or building and which does not require an individual to bend down to wash hard-to-reach areas of the vehicle such as the roof. In addition, there exists a long-felt need in the art for a device that allows a user to clean the vehicle or building exterior such that the device does not require the user to manually scrub the vehicle or building to clean the exterior. Finally, there exists a long-felt need in the art for a device that can be attached to existing vehicle or building cleaning devices known in the art, such as pressure washer wands that allow a user to easily clean and wash the exterior of a vehicle or building.

The subject matter disclosed and claimed herein, in one embodiment thereof, comprises a pressure washer wand cleaning attachment. The attachment includes a roller assembly that can be attached to a pressure washer wand and be positioned in front of the spray tip of the wand such that water from the tip causes the roller assembly to rotate as it is placed on a surface, such as a vehicle or building exterior. The roller assembly may also have a plurality of continuous openings where water and soap may exit the roller head. In addition, the attachment has a clamp assembly that allows it to attach to an existing pressure washer wand.

In this manner, the pressure washer wand cleaning attachment of the present invention accomplishes all of the forgoing objectives and provides an improved device to allow a user to clean and wash the exterior of a vehicle or building. Further, the attachment does not require the user to manually scrub the surface of the vehicle or building, and allows an individual to use the length of a pressure washer wand to easily clean hard-to-reach areas of a vehicle or building without having to bend over or get a ladder to reach difficult to reach areas of the vehicle or other areas, such as when washing the surface of a house or building. Finally, the attachment can be universally applied to any standard pressure washer wand, making the attachment extremely versatile.

SUMMARY OF THE INVENTION

The following presents a simplified summary in order to provide a basic understanding of some aspects of the disclosed innovation. This summary is not an extensive overview, and it is not intended to identify key or critical elements or to delineate the scope thereof. Its sole purpose is to present some general concepts in a simplified form as a prelude to the more detailed description that is presented later.

The subject matter disclosed and claimed herein, in one embodiment thereof, comprises a pressure washer wand cleaning attachment. The device includes a pressure washer wand cleaning attachment that can be attached to the wand of a standard pressure washer. The device attaches to a wand via a plurality of clamps, which may be hose clamps in the preferred embodiment of the device. The device further includes a roller assembly that has a roller body stem and a wand attachment adapter piece. The plurality of clamps further attach to the adapter and stem such that the adapter and stem are secured to the wand. Further, the adapter and stem are threaded such that they can be fastened to one another.

The roller assembly includes a hollow frame that connects to the stem, and the frame has a roller head frame. The roller head frame receives a removable bristled roller head that has a plurality of bristles, such that the hardness of the bristles may be selected in accordance with the job to be performed by the individual using the invention. Accordingly, a user can use the pressure washer wand as normal to clean the exterior of a vehicle or surface of a building. As water exits the wand sprayer tip, the water causes the roller head to spin or turn, which is positioned in front of the tip. Therefore, the water causes the head to spin or turn such that a user can use the head and water from the wand to simultaneously apply water and pressure to wash his or her vehicle, wall or other surface via the spinning roller head.

In a different embodiment, the device may have its own wand with a hollow elbow adapter that connects the wand to the wand attachment adapter. To this effect, a portion of the water within the wand will flow into the adapter, which includes a soap storage box that holds soap or other cleaning solutions, such that when water flows through the adapter, it mixes with the soap to create a cleaning solution mixture. This mixture then flows through the hollow roller stem and roller frame to the roller head frame. Then, the mixture exits the frame head via a plurality of continuous openings, such that the mixture saturates the bristled roller head. Like with the prior described embodiment, some portion of the water within the wand exits the wand via the spray tip and causes the head to spin or rotate. However, this embodiment also allows a soap/water mixture to be applied to a vehicle exterior or wall of a building as the roller head spins as well.

Therefore, the improved pressure washer wand cleaning attachment of the present invention is particularly advantageous as it allows a user to easily wash or clean a vehicle exterior or surface of a building without needing to manually scrub the exterior. Further, because of the length of the wand, a user can easily position the wand to reach hard-to-reach places of a vehicle or a building that would otherwise require bending down or the use of a ladder. In addition, the attachment can be universally used with any standard pressure washer tool, making it extremely versatile and desirable.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE INVENTION

Figure 1:
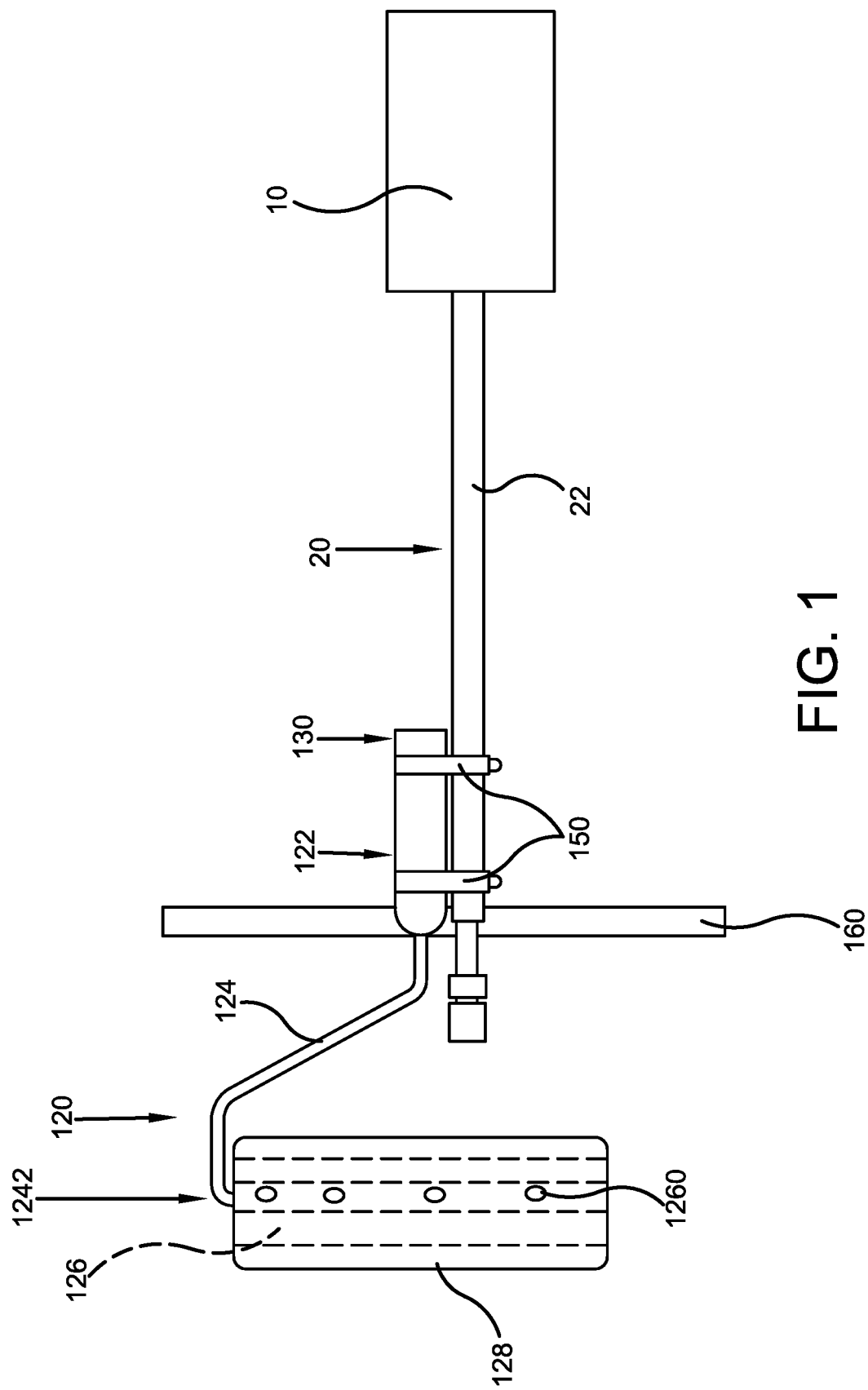
FIG. 1 illustrates a top perspective view of one potential embodiment of a pressure washer wand cleaning attachment of the present invention attached to a pressure washer wand in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a device that allows a user to wash and clean the exterior surfaces of a vehicle or building more easily. There also exists a long-felt need in the art for a device that allows a user to wash and clean the exterior surface of a vehicle or building, where the device does not require an individual to bend down to wash hard-to-reach areas of the vehicle or building. Further, there exists a long-felt need in the art for a device that allows a user to clean a vehicle or building exterior and does not require the user to manually and repeatably scrub the vehicle or building to clean the exterior in different steps. Finally, there exists a long-felt need in the art for a device that can be attached to existing vehicle or building cleaning devices known in the art, such as pressure washers, that allow a user to easily clean and wash the exterior of a vehicle or building.

The present invention, in one exemplary embodiment, is comprised of a pressure washer wand cleaning attachment that can be attached to the wand of any standard consumer pressure washer gun. The device attaches to a wand via a plurality of clamps, which may be hose clamps in the preferred embodiment of the device and further includes a roller assembly. The roller assembly has a roller body stem and a wand attachment adapter piece, where the plurality of clamps further connect to the adapter and stem, such that the adapter and stem are retained upon the wand. Further, the adapter and stem are threaded such that they can be fastened and secured to one another.

The roller assembly also has a hollow frame that attaches to the stem. The frame further includes a roller head frame that receives a removable bristled roller head having a plurality of bristles, which can be selected by the user depending on the cleaning that the user intends to do, e.g. softer bristles may be used on a surface that scratches easily and harder bristles on surface that may withstand greater force, such as a brick wall or siding on a home or building. Accordingly, a user can use the pressure washer wand as normal to clean the exterior of a vehicle or building. However, as water exits the wand sprayer tip, the water causes the roller head to spin or rotate, which is positioned in front of the tip. As a result, the water causes the head to spin or rotate, such that a user can now use the head and water from the wand to simultaneously apply water and wash the vehicle via the spinning roller head.

A differing embodiment of the device may have its own wand that can be used with any standard pressure washer gun known in the art. In this embodiment, the device further includes a hollow elbow adapter that connects the wand to the wand attachment adapter. As such, a portion of the water within the wand will flow into the adapter, and a portion of the wand will exit the spray tip of the wand as normal. In this embodiment, the adapter has a soap storage box which holds soap or another cleaning solution and is connected to the adapter, such that when water flows through the adapter, it mixes with the soap to create a cleaning solution mixture. This mixture then flows through the hollow roller stem and roller frame to the roller head frame. Then, the mixture exits the frame head via a plurality of continuous openings such that the mixture saturates the bristled roller head. As noted, some portion of the water within the wand exits the wand via the spray tip and causes the head to spin. However, this embodiment also allows a soap/water mixture to be applied to a vehicle or building exterior as the roller head spins, therefore eliminating the need for a user to apply soap to a vehicle exterior or building by themself.

Therefore, the improved the pressure washer wand cleaning attachment of the present invention is particularly advantageous as it allows a user to easily wash and clean a vehicle or building exterior without needing to manually scrub the exterior. Further, because of the length of the wand, a user can easily position the wand to reach hard-to-reach places of a vehicle or building that would otherwise require bending down or a ladder to reach. In addition, the attachment can be universally used with any standard pressure washer gun, making it extremely versatile and desirable.

Referring initially to the drawings, FIG. 1 illustrates a top perspective view of one potential embodiment of a pressure washer wand cleaning attachment 100 of the present invention attached to a pressure washer wand 20. In one embodiment of the attachment 100, the attachment 100 is comprised of a roller assembly 120 that contains a roller body stem 122, a roller body frame 124, a bristled roller head 128, a wand attachment adapter 130, a plurality of clamps 150 and a splash guard 160. It is further contemplated that in one particular embodiment of the attachment 100, the attachment 100 can attach to the outer surface 22 of an existing pressure washer gun 10 wand 20 via the plurality of clamps 150. However, a differing embodiment of the attachment 100 may have an integrated pressure washer wand 140, as will be explained more fully below.

Figure 2:
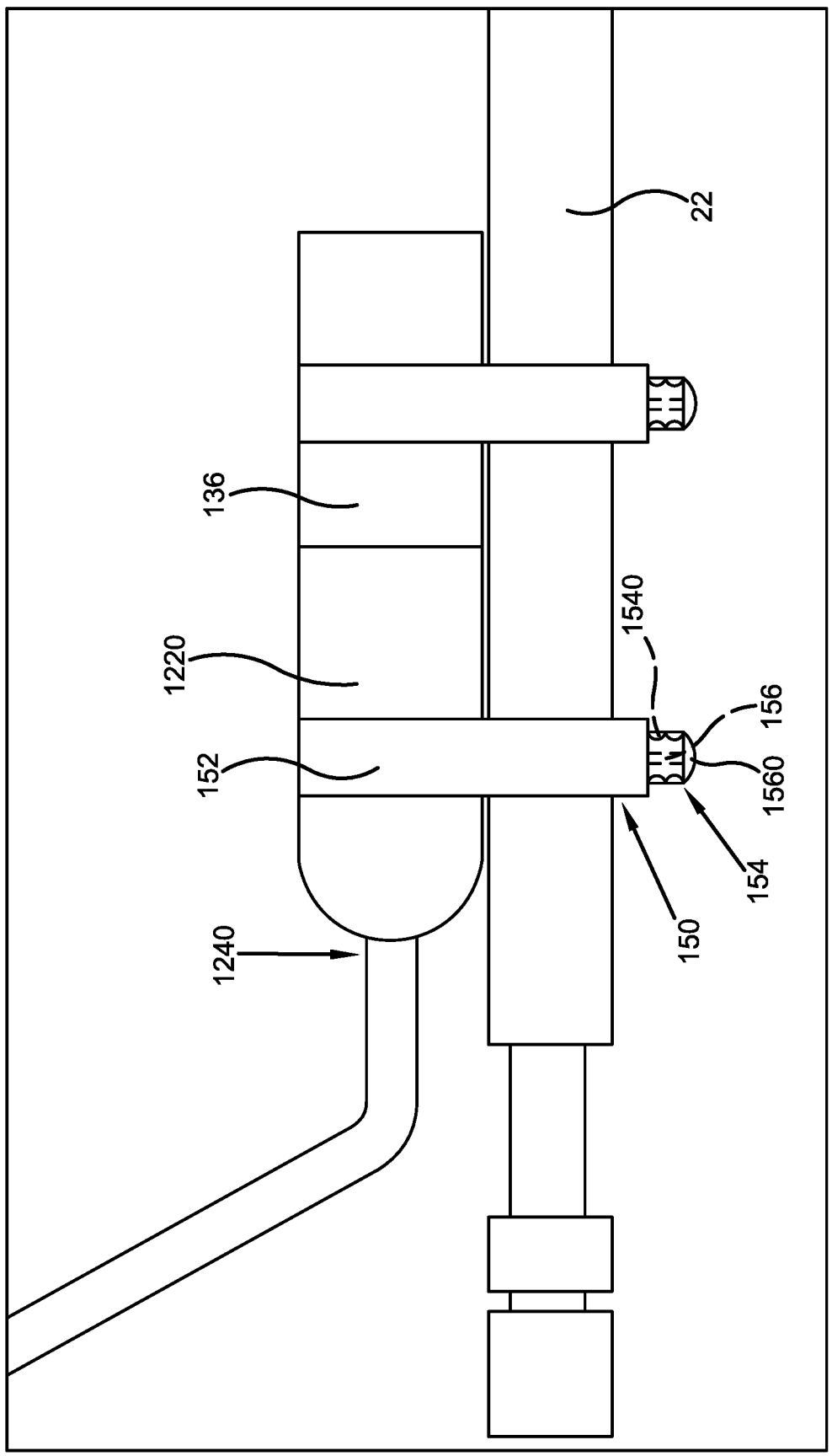
FIG. 2 illustrates an enhanced top perspective view of one potential embodiment of a pressure washer wand cleaning attachment of the present invention attached to a pressure washer wand in accordance with the disclosed architecture.

FIG. 2 illustrates an enhanced top perspective view of one potential embodiment of a pressure washer wand cleaning attachment 100 of the present invention attached to a pressure washer wand 20. In order to secure the attachment 100 to the outer surface 22 of a pressure washer wand 20, the attachment uses a plurality of clamps 150, in which some portion of the clamps 150 are fixedly or removably-attached to the outer surface 136 of the wand attachment adapter 130 and the outer surface 1220 of the roller body stem 122 of the device 100. The clamps 150 are preferably hose clamps that contain a metal band 152, a metal housing 154 that contains interior female threads 1540 and a male threaded screw 156. Accordingly, the band 152 of the clamps 150 can be attached around a wand 20 and then tightened by tightening the screw 156 via the screw head 1560 such that the screw 156 engages more female threads 1540 of the housing 154 (e.g., travels further into the housing) and therefore makes the circumference of the band 152 smaller around the wand 20. However, it is contemplated that the attachment 100 may use other differing clamp 150 types in differing embodiments which may be fixedly-attached or removably-attached to the adapter 130 and stem 120, such as but not limited to: G clamps, C clamps, pipe clamps, spring clamps, etc.

Figure 3:
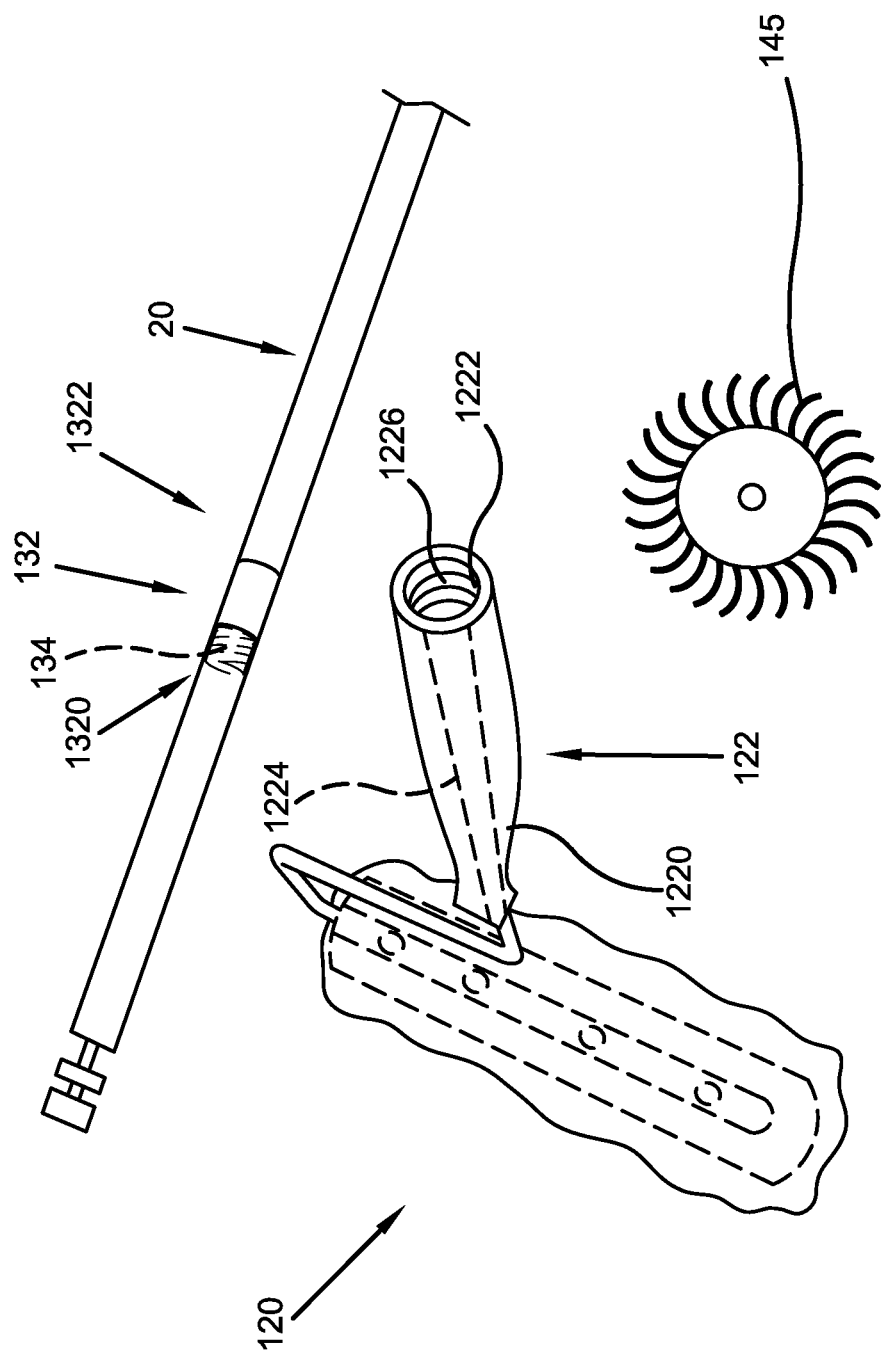
FIG. 3 illustrates a perspective view of one potential embodiment of a pressure washer wand cleaning attachment of the present invention in a dis-assembled state in accordance with the disclosed architecture.

FIG. 3 illustrates a perspective view of one potential embodiment of a pressure washer wand cleaning attachment 100 of the present invention in a dis-assembled state in accordance. In this figure, the wand attachment adapter piece 130 and roller assembly 120 can be more fully observed. The roller assembly 120 has a roller body stem 122 and a roller body frame 124. The stem 122 is preferably cylindrical in shape and is made of a metal such as stainless steel or aluminum, or rigid plastic. The stem 112 is also preferably hollow and contains a hollow interior channel 1224. The end of the stem 122 also contains a continuous opening 1222, where the inside of the opening has a plurality of female threads 1226. The adapter 130 is preferably a cylindrical, metal body 132 that similarly has a first end 1320 that contains a plurality of male threads 134. In this manner, the male threads 134 of the adapter 130 can be threaded to the female threads 1226 of the stem 122 to secure the stem 122 to the adapter 130, while the attachment 100 is being used and is attached to a wand 20. Alternatively, the threads 1226, 134 also allow the roller assembly 120 to be removed for cleaning, maintenance or replacement purposes.

The stem 122 may also have a fixedly or removably-attached splash guard 160 that is molded or attached to some portion of the stem 122. The splash guard 160 may be circular, rectangular, oblong, square, etc. in shape, and may be curved or linear in differing embodiments of the device 100. The guard 160 may also be manufactured from the same rigid plastic or stainless steel, aluminum material or other material as the stem 122, and may also be impact-resistant and transparent, semi-transparent or opaque. In this design, the guard 160 is positioned behind the spray tip 24 of a wand 20, such that any water that exits the tip 24 cannot spray back onto the user who is using a pressure washer gun 10 that is attached to the device 100.

The roller assembly 120 also has a frame 124 where the first end 1240 of the frame 124 is fixedly-attached to the stem 122. The frame 124 is preferably constructed from hollow, tubular metal such as, but not limited to, stainless steel or aluminum, but plastic materials may also be used. The second end 1242 of the frame 124 further has a plurality of features, including a cylindrical roller head frame 126. The frame 126 is preferably made of tubular metal, such as but not limited to stainless steel or aluminum. A cylindrical, bristled roller head 128 can further be slid over the frame 126 via a continuous opening 1280 at one end of the head 128. Therefore, the head 128 can easily be replaced or removed from the frame 126 as needed by simply sliding the head 128 on or off of the frame 126. Further, the head 128 may have a plurality of soft, medium or hard bristles that may be made of silicone, rubber, cloth, hair, artificial cloth, hair material, synthetic fibers or combinations thereof, that are designed to be soft enough so as to not scratch the exterior surface or finish of an automobile. Differing embodiments of the attachment 100 may be comprised of a plurality of heads 128 of differing sizes (e.g., lengths/diameters) and bristle materials as represented by 145 showing a different bristle arrangement. In addition, any surface of the frame 126 may further include a plurality of continuous openings 1260 that allow water to be expelled from the frame 126 and saturate the head 128, as will be explained more fully below.

Figure 4:
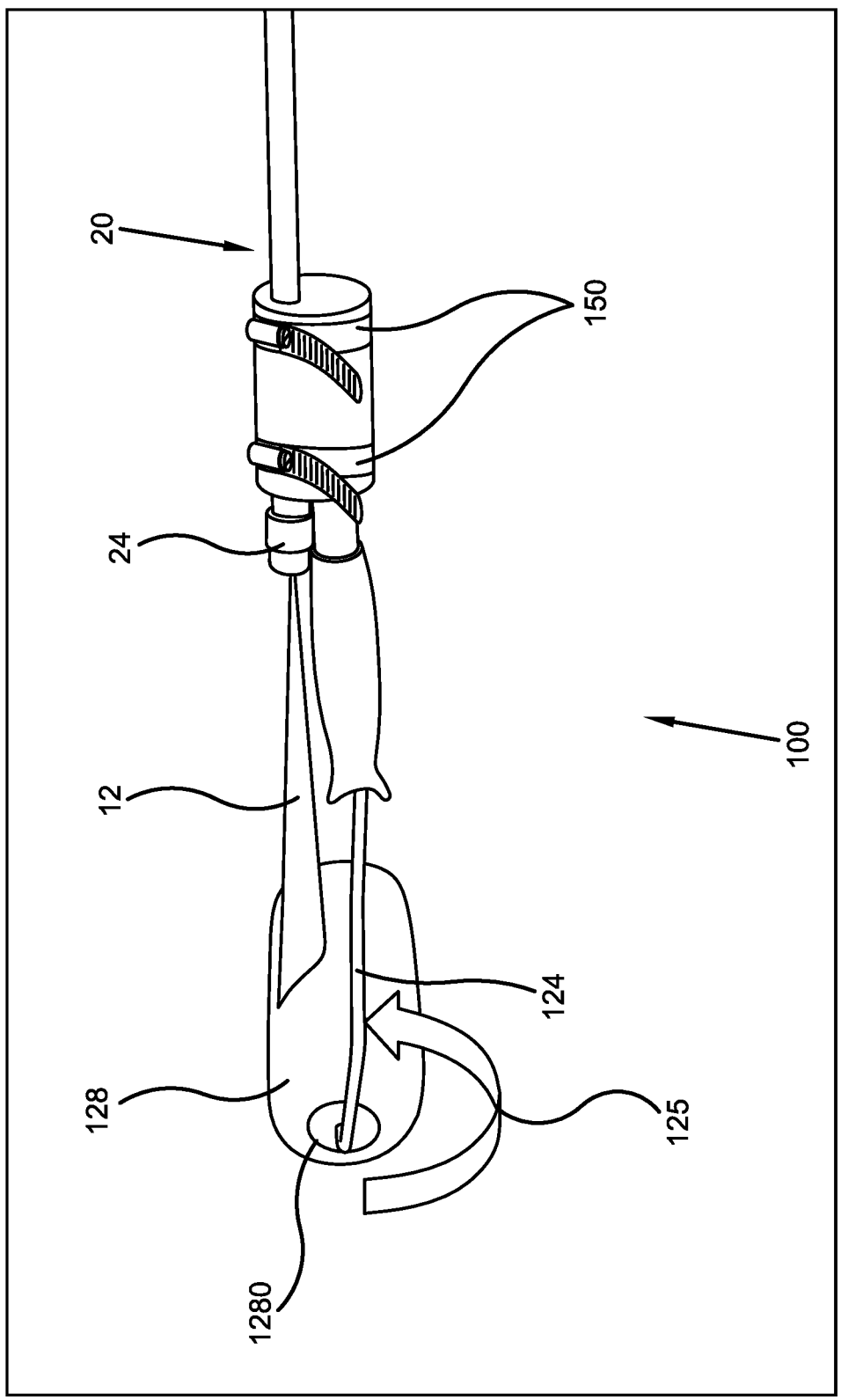
FIG. 4 illustrates a perspective view of one potential embodiment of a pressure washer wand cleaning attachment of the present invention attached to a pressure washer wand while the pressure washer wand is expelling water and rotating the head and brush in accordance with the disclosed architecture.

FIG. 4 illustrates a perspective view of one potential embodiment of a pressure washer wand cleaning attachment 100 of the present invention attached to a pressure washer wand 20 while the pressure washer wand 20 is expelling water 12. In order to use the particular embodiment of the attachment 100 that has been described thus far, a user simply needs to use the clamps 150 to secure the attachment 100 to a pressure washer wand 20. Then, a user can activate the pressure washer gun 10 as normal and allow water 12 to exit the spray tip 24 of the gun 10. With the positioning of the roller head 128 in front of the tip 24, water 12 then exits the tip 24 contacts the head 128, causing the head 128 to spin 125 about the frame 126. In this manner, a user can simultaneously apply water and clean the surface of a vehicle or building with the spinning roller head 128 as it is propelled solely by the force of the water 12 that exits the tip 24. Therefore, a user need not manually scrub a vehicle or building exterior as the water 12 flowing through the attachment 100 from a pressure washer gun 10 provides all the force necessary to sustain the continuous rotation of the roller head 128.

Figure 5:
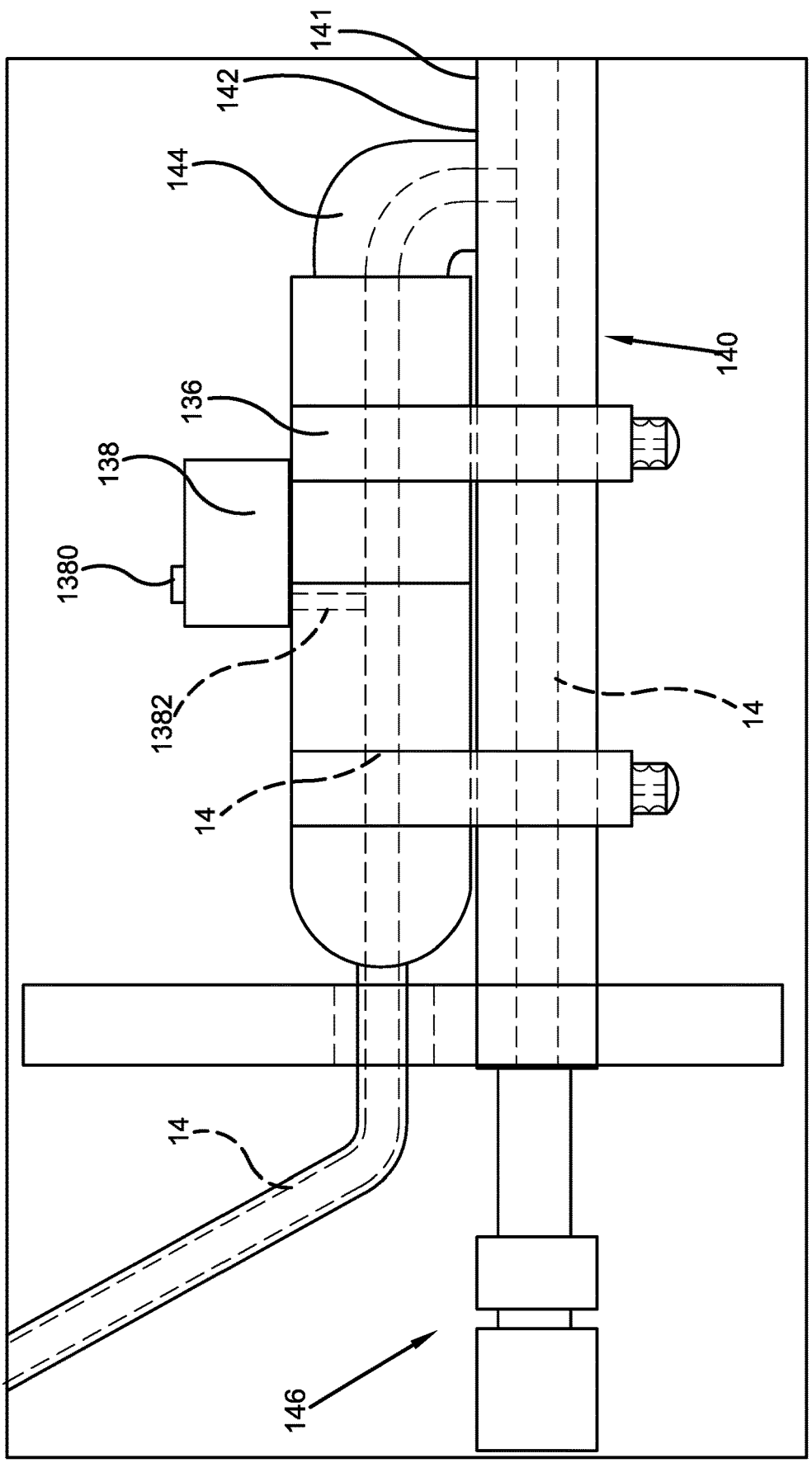
FIG. 5 illustrates an enhanced top perspective view of one potential embodiment of a pressure washer wand cleaning attachment of the present invention attached to a pressure washer wand that displays the internal water flow path of the attachment in accordance with the disclosed architecture.

However, it is contemplated that the attachment 100 may also exist in a differing embodiment than what has been described supra. Accordingly, FIG. 5 illustrates an enhanced top perspective view of said differing potential embodiment of a pressure washer wand cleaning attachment 100 of the present invention attached to a pressure washer wand 140 that comprises the attachment 100, and that also displays the internal water flow path 14 of the attachment 100. In this embodiment of the attachment 100, the attachment has its own wand 140 that can be used with any standard pressure washer gun 10. The wand 140 is generally similar to conventional wands 140 that have a stainless steel or aluminum cylindrical, hollow body 141. In this embodiment of the attachment 100, the second end 1322 of the adapter 130 has a hollow elbow adapter 144 that connects the adapter 130 to the outer surface 142 of the wand 140. In this manner, water can flow through the elbow 144 and into the adapter following the water path 14 shown. Further, in this embodiment of the attachment 100, the outer surface 136 of the adapter 130 may have a soap storage box 138 that may be a plurality of other shapes such as tubular, spherical, etc. The box 138 uses a threaded cap 1380 that when opened allows an individual to pour soap into the box 138. Further, the box 138 connects to the interior of the adapter 130 via a channel 1382 such that soap may also flow into the adapter 130. In this manner, once water travels into the adapter 130 it can mix with soap and create a cleaning solution.

Then, the cleaning solution exits the adapter 130 and travels through the hollow roller body frame 124 and hollow stem 122 until it reaches the roller head frame 126. Once the mixture reaches the frame 126, the mixture can exit the frame via continuous openings 1260, and can then saturate the roller head 128. In this manner, the roller head 128 then becomes saturated with the water and soap mixture, such that the user need not apply soap separately while using the attachment 100. Further, some portion of the water from the wand 140 bypasses the adapter 130 and exits the wand via the removable spray tip 146. In this manner, water can still contact the roller head 128 and cause the head 128 to spin or rotate, as has been described above. Further, this embodiment of the attachment 100 may have a plurality of spray tips 146 of differing styles, sizes, streams, etc.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "pressure washer wand cleaning attachment", "device", and "attachment", are interchangeable and refer to the pressure washer wand cleaning attachment 100 of the present invention.

Notwithstanding the forgoing, the pressure washer wand cleaning attachment 100 of the present invention and its various components can be of any suitable size and configuration as is known in the art without affecting the overall concept of the invention, provided that they accomplish the above-stated objectives. One of ordinary skill in the art will appreciate that the size, configuration and material of the pressure washer wand cleaning attachment 100 as shown in the FIGS. are for illustrative purposes only, and that many other sizes and shapes of the pressure washer wand cleaning attachment 100 are well within the scope of the present disclosure. Although the dimensions of the pressure washer wand cleaning attachment 100 are important design parameters for user convenience, the pressure washer wand cleaning attachment 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A pressure washer cleaning attachment for use with a pressure washer, the pressure washer cleaning attachment comprising:
  an adapter, wherein the adapter is comprised of at least one clamp;
  a roller assembly comprising a roller body stem, a roller body frame, and a roller head frame, wherein a first end of the roller body frame is connected to the roller body stem and a second end of the roller body frame is connected to the roller head frame;
  a housing comprising a cleaning solution; and
  a roller head configured to slide over the roller head frame via a continuous opening at one end of the roller head, wherein the roller head frame is configured to position the roller head in front of a spray tip of a pressure washer wand of the pressure washer so that when pressurized water exits the spray tip and contacts the roller head, the pressurized water causes the roller head to rotate about the roller head frame.

2. The pressure washer cleaning attachment as recited in claim 1, wherein the roller head includes a plurality of bristles.

3. The pressure washer cleaning attachment as recited in claim 2, wherein the plurality of bristles are selected from a group consisting of a soft bristle, a medium bristle and a hard bristle.

4. The pressure washer cleaning attachment as recited in claim 3, wherein the plurality of bristles are comprised from a silicone, a rubber, a cloth, a hair, an artificial cloth, a hair material, a synthetic fiber or a combination thereof.

5. The pressure washer cleaning attachment as recited in claim 1 further comprising a splash guard.

6. The pressure washer cleaning attachment as recited in claim 5, wherein the splash guard is positioned between the roller head and the housing.

7. The pressure washer cleaning attachment as recited in claim 6, wherein the at least one clamp attaches the pressure washer cleaning attachment to the pressure washer wand.

8. The pressure washer cleaning attachment as recited in claim 7 further comprising an elbow.

9. A pressure washer cleaning attachment comprising:
an attachment head for a pressure washer, the attachment head comprising a roller body stem and a roller body frame;
a splash guard attached to the roller body stem;
a roller head; and
wherein the roller body stem is threadedly attachable to a wand of a pressure washer; and
wherein the roller body stem is hollow and comprises an interior channel in fluid communication with the wand of the pressure washer; and
wherein the roller body frame is hollow and extends from the roller body stem and terminates in a hollow roller head frame comprising a plurality of openings along a length of the hollow roller head frame; and
wherein the roller head is positional over the roller head frame so that when pressurized water from the pressure washer travels through the hollow roller head frame through the plurality of openings, the pressurized water contacts the roller head causing the roller head to spin about the hollow roller head frame.

10. The pressure washer cleaning attachment as recited in claim 9, wherein the roller head has a surface made from soft, medium or hard bristles.

11. The pressure washer cleaning attachment as recited in claim 10, wherein the bristles are selected from materials including silicone, rubber, cloth, hair, artificial cloth, hair material, synthetic fibers or combinations thereof.

12. The pressure washer cleaning attachment as recited in claim 9, further including a wand attachment adapter piece to permit the attachment head to be in fluid communication with the pressure washer.

13. The pressure washer cleaning attachment as recited in claim 12, wherein the wand attachment adapter piece further includes an elbow to connect to the housing and to divert fluid from the pressure washer to the housing.

14. A cleaning attachment for a pressure washer, the cleaning attachment comprising:
a roller assembly comprising a roller body stem, a roller body frame, and a roller head frame, wherein a first end of the roller body frame is connected to the roller body stem and a second end of the roller body frame is connected to the roller head frame;
an adaptor for securing the roller body stem to a wand from a pressure washer;
a housing for a cleaning solution, the housing in fluid communication with the adaptor; and
a roller head configured to slide over the roller head frame via a continuous opening at one end of the roller head, wherein the roller head frame is configured to position the roller head in front of a spray tip of a pressure washer wand of the pressure washer so that when pressurized water exits the spray tip and contacts the roller head, the pressurized water causes the roller head to rotate about the roller head frame.

15. The cleaning attachment as recited in claim 14, wherein the roller head has one of a plurality of soft, medium or hard bristles and the pressure washer adaptor wand is held to the pressure washer by at least one clamp.

* * * * *